(12) United States Patent
Bernard et al.

(10) Patent No.: US 6,348,284 B1
(45) Date of Patent: Feb. 19, 2002

(54) NON-SINTERED NICKEL ELECTRODE FOR A SECONDARY ELECTRO-CHEMICAL CELL HAVING AN ALKALINE ELECTROLYTE

(75) Inventors: Patrick Bernard, Bordeaux; Stéphane Senyarich, Mornac, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/479,931

(22) Filed: Jan. 10, 2000

(30) Foreign Application Priority Data

Dec. 23, 1999 (FR) .............................. 99 16336

(51) Int. Cl.$^7$ ................................ H01M 4/32
(52) U.S. Cl. ................... 429/223; 429/206; 429/232
(58) Field of Search ................ 429/223, 206, 429/232

(56) References Cited

FOREIGN PATENT DOCUMENTS

| EP | 0 468 942 A2 | 1/1992 |
|---|---|---|
| EP | 0 930 663 A1 | 7/1999 |
| JP | 02 262 245 A | 10/1990 |
| JP | 06 196 161 A | 7/1994 |
| JP | 10 214 622 A | 8/1998 |
| JP | 10 334 911 A | 12/1998 |

*Primary Examiner*—Hoa Van Le
(74) *Attorney, Agent, or Firm*—Sughrue Mion, PLLC

(57) ABSTRACT

The present invention relates to a non-sintered nickel electrode for a secondary cell having an alkaline electrolyte. The electrode has a current collector and a paste comprising a powder active material based on nickel hydroxide, a conductive material containing lithium and cobalt, and a binder. The active material is made up of particles of a hydroxide containing a majority of nickel that is at least partially oxidized into a β structure oxyhydroxide, said particles being at least partially coated in lithiated oxide of nickel and cobalt.

29 Claims, No Drawings

NON-SINTERED NICKEL ELECTRODE FOR A SECONDARY ELECTRO-CHEMICAL CELL HAVING AN ALKALINE ELECTROLYTE

BACKGROUND OF THE INVENTION

The present invention relates to a non-sintered nickel electrode used in particular as a positive electrode in a secondary electrochemical cell having an alkaline electrolyte, such as nickel metal hydride, nickel cadmium, nickel iron, nickel zinc, or nickel hydrogen storage batteries. The invention also relates to a cell containing the electrode, and to a method of preparing the electrode.

A non-sintered nickel electrode is made up of a two-dimensional support such as a continuous or perforated foil, an expanded metal, a grid, or a cloth, or indeed a three-dimensional support such as a foam or a felt, the support serving as a current collector. A paste containing the active material which is constituted by a nickel-based hydroxide and a binder, usually associated with a conductive material, is coated on the collector. Nickel hydroxide is a poorly conductive compound which requires conductive material to be included in the electrode to enable electricity to percolate well. As a general rule, the conductive material is a cobalt compound such as metallic cobalt Co, cobalt hydroxide $Co(OH)_2$, and/or cobalt oxide CoO.

The first time the storage battery is charged, these compounds are oxidized into cobalt oxyhydroxide CoOOH in which the cobalt is taken to a degree of oxidation greater than or equal to +3. Cobalt oxyhydroxide is stable in the normal operating range of the nickel positive electrode and it is insoluble in the alkaline electrolyte. It enables electricity to percolate in the electrode.

For example, in order to accelerate the formation of cobalt oxyhydroxide CoOOH, document U.S. Pat. No. 5,405,714 proposes using metallic cobalt powder Co in the electrode together with nickel oxyhydroxide powder NiOOH which is the active material, at a concentration that is less than 60% by weight of the cobalt. The storage battery is left at rest until the potential of the positive electrode reaches that of the $Co/Co(OH)_2$ couple, after which it is charged and discharged. The particles of cobalt Co are covered in a layer of cobalt oxyhydroxide CoOOH while the nickel oxyhydroxide NiOOH is reduced to the hydroxide state $Ni(OH)_2$.

On initial charging, the oxidation of the cobalt compounds corresponds to equal quantities of electricity on the positive and negative electrodes. In addition, during subsequent discharges, the positive electrode is not fully discharged (oxidation degree 2) but is discharged only to the nickel being oxidized to degree 2.2. As a result, the non-discharged capacity or "precharge" of the negative electrode increases on each cycle, thereby progressively decreasing the effective capacity of said electrode and contributing to shortening the lifetime of the storage battery.

When stored in a fully discharged state, an alkaline storage battery possessing a non-sintered nickel positive electrode sees its voltage decrease over time. When the duration of storage exceeds a few months, its voltage tends towards 0 V. Under such conditions, cobalt oxy-hydroxide CoOOH reduces slowly. The cobalt is taken initially to oxidation degree +2.66 in $Co_3O_4$, and then it reaches oxidation degree +2 in $Co(OH)_2$.

Unfortunately, cobalt hydroxide $Co(OH)_2$ is a compound that is highly soluble in the electrolyte. After being stored for a period of several months, a loss of conductivity is observed due to part of the percolation network in the non-sintered electrode dissolving. This gives rise to an irreversible loss of capacity.

Document EP-0 789 408 proposes using nickel hydroxide powder having grains coated in a cobalt compound containing 0.1% to 10% by weight of sodium. Documents U.S. Pat. No. 5,672,447 and EP-0 798 801 propose covering a nickel hydroxide powder in a disordered cobalt compound of valency greater than +2. Such coatings are likewise not stable during storage at low potential.

In order to remedy that problem, European patent application EP-0 866 510 proposes an electrode containing nickel hydroxide as the main component with a conductive material constituted by an oxide of lithium and cobalt represented by the formula $Li_xCoO_2$, where x lies in the range 0.2 to 0.9. The active material of the paste can also contain a mixture of nickel hydroxide powder and of nickel hydroxide powder in which the surface of the particles is coated in a layer of lithium and cobalt oxide, with lithium and cobalt oxide being added thereto as the conductive material. During storage of the cell, the observed irreversible loss of capacity is still too high.

SUMMARY OF THE INVENTION

An object of the present invention is to propose a non-sintered nickel electrode in which irreversible loss of capacity during storage in the discharged state is smaller than that of presently known electrodes.

Another object of the invention is to provide a nickel storage battery whose precharge is reduced by using a novel positive electrode.

The present invention provides a non-sintered nickel electrode for a secondary cell having an alkaline electrolyte, the electrode comprising a current collector and a paste comprising an active material in powder form based on nickel hydroxide, a conductive material containing lithium and cobalt, and a binder, the electrode being characterized in that said active material is constituted by particles of a hydroxide containing a majority of nickel that is at least partially oxidized into β structure oxyhydroxide, said particles being at least partially coated in said conductive material which is a lithiated oxide of nickel and cobalt.

In order to ensure that the positive electrode has an optimum usage ratio, the conductivity of said conductive material is greater than $10^{-2}$ Siemens.cm$^{-1}$ after at least one charge/discharge cycle, referred to as "electrochemical forming".

In a preferred embodiment, said lithiated oxide of nickel and cobalt has the formula $Li_xNi_yCo_{1-y}O_2$ where $0.1 \leq x \leq 1$ and $0 \leq y \leq 0.9$, and preferably $0.02 \leq y \leq 0.9$.

The degree of oxidation of the cobalt in said lithiated oxide is not less than 3, and preferably equal to or greater than 3.2.

In another embodiment, the lithiated oxide contains sodium. Preferably, the lithiated oxide has the formula $Li_xNa_zNi_yCo_{1-y}O_2$ where x+z lies in the range 0.1 to 1 and z lies in the range 0 to 0.5, i.e. $0.1 \leq x+z \leq 1$ and $0 \leq z \leq 0.5$.

Preferably, the quantity of lithiated oxide lies in the range 3% to 9% by weight relative to said active material.

In a variant, said paste also contains the powder form of the lithiated oxide of nickel and cobalt.

The conductive material occupies at least part of the micropores in the surface of the nickel-based hydroxide particle. This is the microporosity that is accessible to the electrolyte and that contributes to the electrochemically active surface of the hydroxide.

Without modifying the invention, the nickel-based hydroxide particles can be of various shapes, going from a more or less spherical shape to an irregular shape.

In a preferred implementation of the invention, 5% to 35% by weight of said nickel hydroxide Ni(OH)$_2$ is oxidized into a β structure oxyhydroxide NiOOH, and preferably 5% to 20% by weight, and more preferably still 10% to 20%.

It is important that the γ-NiOOH oxyhydroxide does not form since the γ phase has lattice parameters that are larger than those of the β phase. This characteristic of the γ phase gives rise to breaks and to partial destruction in the coating which harms the performance of the electrode, and in particular harms its ability to conserve storage capacity.

It should naturally be understood that the term "electrochemically active material containing nickel hydroxide" as used in the present application can mean nickel hydroxide, a hydroxide that contains mainly nickel, and also a nickel hydroxide containing at least one syncrystallized hydroxide of an element selected from zinc (Zn), cadmium (Cd), magnesium (Mg), and aluminum (Al), and at least one syncrystallized hydroxide of an element selected from cobalt (Co), manganese (Mn), aluminum (Al), yttrium (Y), calcium (Ca), strontium (Sr), zirconium (Zr), and copper (Cu).

A syncrystallized hydroxide contained in nickel hydroxide is a hydroxide that forms a solid solution with nickel hydroxide, i.e. that occupies a continuously variable fraction of the atomic sites defined by the crystal lattice of the nickel hydroxide.

Said current collector is advantageously a nickel foam having porosity of not less than 90%.

The paste contains a binder which ensures that the active layer adheres to the collector.

In a first variant, said binder is a mixture of a crystalline polymer and an elastomer. Preferably, the proportion of said crystalline polymer lies in the range 40% to 75% by weight of said binder and the proportion of said elastomer lies in the range 25% to 60% by weight of said binder.

The crystalline polymer can be selected from a fluorine-containing polymer such as a copolymer comprising fluorinated ethylene propylene (FEP), poly-propylhexafluoride (PPHF) or polytetrafluoroethylene (PTFE), and a polyolefin such as polyethylene (PE).

The elastomer can be selected from a copolymer of styrene, ethylene, butadiene, and styrene (SEBS), a terpolymer of styrene, butadiene, and vinylpyridine (SBVR), and a copolymer of styrene and butadiene (SBR).

In a second variant, said binder comprises a first component selected from a fluorine-containing polymer such as polytetrafluoroethylene (PTFE), and at least one second component selected from a cellulose compound such as carboxymethylcellulose (CMC), hydroxypropylmethylcellulose (HPMC), hydroxyethylcellulose (HEC), and hydroxypropylcellulose (HPC), and a fluorine-containing compound such as polyvinylidene fluoride (PVDF), and an elastomer selected as a copolymer of styrene and butadiene (SBR).

In order to make the electrode easier to manufacture, the paste can also contain a thickener such as a cellulose compound selected from as carboxymethylcellulose (CMC), hydroxypropylmethylcellulose (HPMC), hydroxypropylcellulose (HPC), and hydroxyethylcellulose (HEC).

The paste can also contain at least one other compound selected from zinc compounds such as ZnO or Zn(OH)$_2$, yttrium compounds such as Y$_2$O$_3$ or Y(OH)$_3$, and calcium compounds such as CaO, Ca (OH)$_2$, or CaF$_2$. This compound is preferably added in powder form.

The present invention also provides a method of manufacturing an electrode of the present invention as described above. The method comprises the following steps:

preparing a solution containing an oxidizing agent;

immersing particles of nickel hydroxide coated in said conductive material in said solution;

leaving said particles in contact with said solution;

separating said oxidized particles from said solution; and washing and drying said oxidized particles.

Said oxidizing agent is preferably selected from sodium hypochlorite and calcium hypochlorite. The oxidizing solution is preferably an aqueous solution of sodium hypochlorite or of calcium hypochlorite. The quantity of oxidizing agent used lies in the range once to three times the stoichiometric quantity required for oxidizing said nickel hydroxide.

The temperature of the solution is 20° C., but it can be raised to up to 90° C. without modifying the characteristics of the resulting products. The temperature of the solution is preferably no more than 40° C.

The duration of contact between the nickel hydroxide particles and the solution lies in the range one hour to three hours, which is sufficient, but the duration of contact can be lengthened without impediment.

The drying temperature lies in the range 40° C. to 100° C. for a duration lying in the range 12 hours to 48 hours.

The present invention also provides a secondary electrochemical cell of the nickel-metal hydride type comprising:

a positive electrode of the present invention as described above;

a separator;

a negative electrode whose electrochemically active material is an intermetallic compound capable of forming a hydride when charged, the total quantity of electro-chemically active material of said negative electrode exceeding the total quantity of electrochemically active material of said positive electrode in such a manner that the total negative capacity exceeds the total positive capacity by a quantity referred to as "over-capacity", a portion of said over-capacity, referred to as "precharge", being partially in the charged state once said positive electrode has been fully discharged, said precharge representing less than 12% of said negative capacity; and an alkaline aqueous electrolyte.

Other characteristics and advantages of the present invention will appear on reading the following description of embodiments given by way of non-limiting illustration.

EXAMPLE 1

An electrode X containing active material constituted by a nickel hydroxide powder coated in a layer of a compound of cobalt having valency greater than 2 was prepared as follows.

A solution of cobalt sulfate CoSO$_4$ and a solution of sodium hydroxide NaOH was added to a suspension of nickel hydroxide powder in water while maintaining the pH at 10. A layer of the cobalt compound was deposited on the nickel hydroxide particles. The ratio in moles of cobalt compound to nickel hydroxide was 10%.

The previously obtained active material was then chemically oxidized as follows. The powder was added to an aqueous solution of sodium hydroxide NaOH at a concentration of 25% by weight. The result was subjected to heat treatment at 100° C. in the presence of gaseous oxygen. After washing in water and drying, an active material powder was obtained constituted by nickel hydroxide particles coated in a compound of cobalt having valency of 2.9 and a disordered structure.

An electrode X was manufactured as follows, using a paste whose composition by weight was as follows (expressed as a % relative to the weight of the paste):

active material: nickel hydroxide coated in a layer of cobalt compound 98.7% binder: polytetrafluoroethylene (PTFE) 1% thickener: carboxymethylcellulose (CMC) 0.3%

The viscosity of the paste was adjusted using water. The paste was introduced into the current collector which was a nickel foam having porosity of about 95%. The assembly was then dried and rolled so as to obtain the electrode X.

The electrode was used as a positive electrode in a storage battery AX of nominal capacity C that also included a negative electrode, a separator, and an electrolyte.

The electrochemically active material of the negative electrode was an intermetallic compound capable of forming a hydride once charged. Its capacity was greater than that of the positive electrode. Each positive electrode was placed against a negative electrode and separated therefrom by a separator constituted by a non-woven cloth of polypropylene so as to form the electrochemical stack. The spiral-wound stack was inserted in a metal can and impregnated with an alkaline electrolyte constituted by an aqueous solution of 7.4 N potassium hydroxide KOH, 0.5 N lithium hydroxide LiOH, and 0.4 N sodium hydroxide NaOH.

Irreversible loss from the storage battery AX while being stored in the fully discharged state was evaluated under the following conditions:

cycle 1:

charge at 0.1 Ic for 16 hours at 20° C., where Ic is the current necessary for discharging the nominal capacity C of a storage battery in 1 hour, discharge at 0.2 Ic down to a stop voltage of 1 volt;

cycles 2 and 3:

charge at Ic for 1.2 hours at 20° C., discharge at Ic down to a stop voltage of 1 volt.

The storage battery AX was then stored in the discharged state at ambient temperature. After about 2 months, it was observed that the battery voltage had become less than the voltage required for cobalt oxyhydroxide to be stable (1.05 V).

After storage for 6 months, the remaining capacity was measured under the following conditions: cycles 4 to 9:

charge of Ic for 1.2 hours at 20° C., discharge at Ic down to 1 volt.

The capacities per unit mass both before and after storage relative to the weight of active material are to be found in Table 1 below.

EXAMPLE 2

An electrode Y containing active material constituted by nickel hydroxide powder coated in a layer of lithium and cobalt oxide was prepared as follows.

A solution of cobalt sulfate $CoSO_4$ and a solution of sodium hydroxide NaOH was added to a suspension of nickel hydroxide powder in water in such a manner as to ensure that the pH remained in the range 9 to 10. A cobalt hydroxide $Co(OH)_2$ layer covered the nickel hydroxide particles. The result was subjected to heat treatment for 48 hours at 120° C. to transform the cobalt hydroxide $Co(OH)_2$ into oxyhydroxide CoOOH. The result was then introduced into an alkaline solution of lithium hydroxide LiOH, and was maintained at 80° C. under stirring for 48 hours. A nickel hydroxide powder was obtained in which the particles were coated in a lithiated oxide of cobalt $LiCoO_2$. The lithiated oxide of cobalt represented 5% by weight relative to the active material.

An electrode Y was manufactured using a paste whose composition by weight (expressed in % relative to the weight of the paste) was as follows:

| | |
|---|---|
| active material: nickel hydroxide coated in a layer of lithiated oxide of cobalt | 98.7% |
| binder: PTFE | 1% |
| thickener: CMC | 0.3% |

The viscosity of the paste was adjusted using water. The paste was introduced into the current collector which was a nickel foam having porosity of about 95%. The assembly was dried and then rolled to obtain electrode Y.

The electrode was used as the positive electrode in a storage battery AY analogous to that described in Example 1.

Irreversible loss from the battery AY during storage in the discharged state was evaluated under the conditions described in Example 1.

The capacities per unit mass both before and after storage relative to the mass of active material are given in Table 1 below.

EXAMPLE 3

An electrode $Z_1$ containing an active material constituted by nickel hydroxide powder in which the particles were coated in a layer of lithiated oxide of nickel and cobalt was prepared as follows.

A nickel hydroxide powder was put into suspension in a solution of cobalt sulfate $CoSO_4$ at a concentration of 4 M, and of nickel sulfate $NiSO_4$ at a concentration of 0.2 M maintained at a temperature of 70° C. A solution of sodium hydroxide NaOH was added slowly so as to maintain the pH of the solution in the range 9 to 11. The resulting powder was then washed and dried.

Nickel hydroxide particles were obtained that were coated in a layer of nickel and cobalt hydroxide having the composition $Ni_{0.5}Co_{0.95}(OH)_2$. The powder was then put into solution in a solution of lithium hydroxide LiOH at a concentration of 5 N, maintained at 90° C. for 24 hours in the presence of oxygen. The powder was then washed and dried.

A nickel hydroxide powder was obtained that was coated in lithiated oxide of nickel and cobalt having the composition $Li_xNi_{0.05}Co_{0.95}O_2$. By spectroscopic analysis, it was observed that x was equal to 0.95. The diameter of the particles in the resulting powder was 11 $\mu$m, as measured using laser granulometry. The quantity of lithiated oxide of nickel and cobalt deposited on the nickel hydroxide powder was 6%.

The nickel hydroxide powder coated in lithiated oxide of nickel and cobalt was then subjected to chemical oxidation under the following conditions. The powder was put into contact with an oxidizing solution containing sodium hypochlorite NaOCl in stoichiometric quantity so as to obtain an oxidation ratio of 13%. The particles were kept in suspension at a temperature of 20° C. for 1 hour. The powder was then washed at ambient temperature in distilled water, and then dried at a temperature of about 70° C. for 5 hours.

X-ray diffraction was used to verify that the nickel hydroxide $Ni(OH)_2$ had been partially oxidized to $\beta$-NiOOH, and that the crystallographic characteristics of the surface layer had not been modified. The diameter of the particles in the resulting powder, as measured by laser granulometry, was 11 µm. By spectroscopic analysis, it was observed that the coating of lithiated oxide had the formula $Li_xNi_{0.05}Co_{0.95}O_2$ where x was equal to 0.93.

The electrode $Z_1$ was manufactured as follows using a paste whose composition by weight (expressed in % relative to the weight of the paste) was as follows:

| | |
|---|---|
| active material: nickel hydroxide coated in a lithiated oxide of nickel and cobalt | 98.7% |
| binder: PTFE | 1% |
| thickener: CMC | 0.3% |

The viscosity of the paste was adjusted using water. The paste was introduced into the current collector which was a nickel foam having porosity of about 95%. The assembly was then dried and rolled to obtain electrode Z.

The electrode was used as the positive electrode in a storage battery $AZ_1$ analogous to that described in Example 1.

The irreversible loss from the storage battery $AZ_1$ during storage in the discharged state was evaluated under the conditions described in Example 1.

The capacities per unit mass of the electrode $Z_1$, both before and after storage, stated relative to the weight of the active material, are given in Table 1 below.

TABLE 1

| Battery | AX | AY | $AZ_1$ |
|---|---|---|---|
| Capacity per unit mass on cycle 3 (mAh/g) | 231 | 240 | 251 |
| Capacity per unit mass on cycle 9 (mAh/g) | 205 | 235 | 250 |
| Irreversible loss during storage (%) | 11 | 2 | 0.4 |

EXAMPLE 4

An electrode $Z_2$ analogous to Example 3 was made with the exception that the active material was a nickel hydroxide powder comprising mostly nickel, containing about 3.5% syncrystallized cobalt hydroxide and about 5% syncrystallized zinc hydroxide, and the particles thereof were coated in a layer of lithiated oxide of nickel and cobalt. The electrode was prepared in the manner described in Example 2.

An electrode $Z_2$ was included in a storage battery $AZ_2$ in the same manner as in Example 1.

The irreversible loss from the battery $AZ_2$ during storage in the discharged state was evaluated under the conditions described in Example 1 and gave the same results as for the battery $AZ_1$.

We claim:

1. A non-sintered nickel electrode for a secondary cell having an alkaline electrolyte, the electrode comprising a current collector and a paste comprising an active material based on nickel hydroxide in powder form, a conductive material containing lithium and cobalt, and a binder, the electrode being characterized in that said active material is constituted by particles of a hydroxide containing a majority of nickel that is at least partially oxidized into β structure oxyhydroxide, said particles being at least partially coated in said conductive material which is a lithiated oxide of nickel and cobalt.

2. An electrode according to claim 1, in which the conductivity of said conductive material is greater than $10^{-2}$ Siemens.cm$^{-1}$ after at least one charge/discharge cycle.

3. An electrode according to claim 1, in which said lithiated oxide of nickel and cobalt has the formula $Li_xNi_yCo_{1-y}O_2$ where $0.1 \leq x \leq 1$ and $0 \leq y \leq 0.9$.

4. An electrode according to claim 3, in which $0.02 \leq y \leq 0.9$.

5. An electrode according to claim 1, in which the degree of oxidation of the cobalt in said lithiated oxide is not less than 3.

6. An electrode according to claim 1, in which said lithiated oxide contains sodium.

7. An electrode according to claim 6, in which said lithiated oxide has the formula $Li_xNa_zNi_yCo_{1-y}O_2$ where x+z lies in the range 0.1 to 1 and z lies in the range 0 to 0.5.

8. An electrode according to claim 1, in which the quantity of said lithiated oxide lies in the range 3% to 9% by weight relative to said active material.

9. An electrode according to claim 1, in which said paste also contains said lithiated oxide in powder form.

10. An electrode according to claim 1, in which 5% to 35% by weight of said nickel hydroxide is oxidized into a β structure oxyhydroxide.

11. An electrode according to claim 10, in which 5% to 20% by weight of said nickel hydroxide is oxidized into β structure oxyhydroxide.

12. An electrode according to claim 10, in which 10% to 20% by weight of said nickel hydroxide is oxidized into β structure hydroxide.

13. An electrode according to claim 1, in which said nickel hydroxide contains and at least one syncrystallized hydroxide of an element selected from zinc, cadmium, magnesium, and aluminum.

14. An electrode according to claim 13, in which said nickel hydroxide also contains at least one syncrystallized hydroxide of an element selected from cobalt, manganese, aluminum, yttrium, calcium, strontium, zirconium, and copper.

15. An electrode according to claim 1, in which said current collector is a nickel foam.

16. An electrode according to claim 1, in which said binder is a mixture of a crystalline polymer and of an elastomer.

17. An electrode according to claim 16, in which the proportion of said crystalline polymer lies in the range 40% to 75% by weight of said binder and the proportion of said elastomer lies in the range 25% to 60% by weight of said binder.

18. An electrode according to claim 16, in which said crystalline polymer is selected from a fluorine-containing polymer and a polyolefin.

19. An electrode according to claim 16, in which said elastomer is selected from a styrene/ethylene/butylene/styrene copolymer, a styrene/butadiene/vinylpyridine terpolymer, and a styrene/butadiene copolymer.

20. An electrode according to claim 1, in which said binder comprises a first component based on polytetrafluoroethylene and a second component selected from carboxymethylcellulose, hydroxypropylmethylcellulose, hydroxyethylcellulose, hydroxypropylcellulose, polyvinylidene fluoride, and a styrene/butadiene copolymer.

21. A secondary electrochemical cell comprising:
   a positive electrode according to claim 1,
   a separator;
   a negative electrode whose electrochemically active material is an intermetallic compound capable of forming a hydride when charged, the total quantity of electrochemically active material of said negative electrode exceeding the total quantity of electrochemically active material of said positive electrode in such a manner that the total negative capacity exceeds the total positive capacity by a quantity referred to as "over-capacity", a portion of said over-capacity, referred to as "precharge", being partially in the charged state once said positive electrode has been fully discharged, said precharge representing less than 12% of said negative capacity; and an alkaline aqueous electrolyte.

22. A method of manufacturing an electrode according to claim 1, the method comprising the following steps:

preparing a solution containing an oxidizing agent;

immersing particles of nickel hydroxide coated in said conductive material in said solution;

leaving said particles in contact with said solution;

separating said oxidized particles from said solution; and washing and drying said oxidized particles.

23. A method according to claim 22, in which said oxidizing agent is selected from sodium hypochlorite and calcium hypochlorite.

24. A method according to claim 22, in which the quantity of said oxidizing agent lies in the range once to three times the stoichiometric quantity required for oxidizing said nickel hydroxide.

25. A method according to claim 22, in which the temperature of the solution lies in the range 20° C. to 90° C.

26. A method according to claim 25, in which the temperature of the solution lies in the range 20° C. to 40° C.

27. A method according to claim 22, in which the duration of contact between the nickel hydroxide particles and the solution lies in the range one hour to three hours.

28. A method according to claim 22, in which the drying temperature lies in the range 40° C. to 100° C.

29. A method according to claim 22, in which the duration of drying lies in the range 12 hours to 48 hours.

* * * * *